United States Patent
Albrecht et al.

(10) Patent No.: US 12,084,121 B2
(45) Date of Patent: Sep. 10, 2024

(54) STEER-BY-WIRE STEERING SYSTEM, METHOD FOR OPERATING A STEER-BY-WIRE STEERING SYSTEM AND VEHICLE

(71) Applicant: Bayerische Motoren Werke Aktiengesellschaft, Munich (DE)

(72) Inventors: Johannes Albrecht, Munich (DE); Matthias Schoelzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 256 days.

(21) Appl. No.: 17/786,683

(22) PCT Filed: Dec. 8, 2020

(86) PCT No.: PCT/EP2020/085086
§ 371 (c)(1),
(2) Date: Jun. 17, 2022

(87) PCT Pub. No.: WO2021/122160
PCT Pub. Date: Jun. 24, 2021

(65) Prior Publication Data
US 2023/0017618 A1    Jan. 19, 2023

(30) Foreign Application Priority Data
Dec. 19, 2019   (DE) ...................... 10 2019 135 047.6

(51) Int. Cl.
*B62D 5/00*     (2006.01)
*B62D 5/04*     (2006.01)
(Continued)

(52) U.S. Cl.
CPC .............. *B62D 5/006* (2013.01); *B62D 6/008* (2013.01); *B62D 5/0484* (2013.01); *B62D 6/002* (2013.01); *B62D 15/0215* (2013.01)

(58) Field of Classification Search
None
See application file for complete search history.

(56) References Cited

U.S. PATENT DOCUMENTS

| | | | |
|---|---|---|---|
| 6,408,687 B1 * | 6/2002 | Ashrafi | B62D 6/04 73/117.02 |
| 6,757,601 B1 * | 6/2004 | Yao | B62D 6/002 701/41 |

(Continued)

FOREIGN PATENT DOCUMENTS

| | | | | |
|---|---|---|---|---|
| CN | 1769122 A | * | 5/2006 | ............. B62D 5/006 |
| CN | 111634325 A | * | 9/2020 | ............. B62D 1/286 |

(Continued)

OTHER PUBLICATIONS

International Search Report (PCT/ISA/210) issued in PCT Application No. PCT/EP2020/085086 dated Mar. 4, 2021 with English translation (four (4) pages).

(Continued)

*Primary Examiner* — Kevin R Steckbauer
(74) *Attorney, Agent, or Firm* — Crowell & Moring LLP

(57) ABSTRACT

A steer-by-wire steering system for a vehicle includes a steering input device, a feedback actuator, and a steering assembly that can be connected to at least one steerable vehicle wheel. The steering assembly has a steering actuator device, a control device, and a feedback actuator monitoring device. The steer-by-wire steering system further has a synchronization monitoring device that is designed and configured, in at least one operating state of the steer-by-wire steering system, to determine a synchronization offset between a current position of the steering input device and a current position of the steering actuator device and/or of the at least one steerable vehicle wheel. The control device is further designed and configured, in at least one operating state of the steer-by-wire steering system, to further control (Continued)

the steering actuator device in accordance with the synchronization offset determined by the synchronization monitoring device.

18 Claims, 2 Drawing Sheets

(51) Int. Cl.
  *B62D 6/00* (2006.01)
  *B62D 15/02* (2006.01)

(56) References Cited

U.S. PATENT DOCUMENTS

| | | | | |
|---|---|---|---|---|
| 6,865,462 | B2 * | 3/2005 | Yao | B62D 6/002 |
| | | | | 701/41 |
| 6,879,118 | B2 * | 4/2005 | Cao | B62D 5/092 |
| | | | | 180/443 |
| 6,922,620 | B2 * | 7/2005 | Augustine | B60R 25/02 |
| | | | | 701/41 |
| 7,092,805 | B2 * | 8/2006 | Kasahara | B62D 5/006 |
| | | | | 701/41 |
| 7,100,733 | B2 * | 9/2006 | Zhao | B62D 5/006 |
| | | | | 701/41 |
| 8,224,528 | B2 * | 7/2012 | Hayama | B62D 5/001 |
| | | | | 701/41 |
| 8,744,687 | B2 * | 6/2014 | Hayama | B62D 6/003 |
| | | | | 701/41 |
| 9,050,999 | B2 * | 6/2015 | Kuipers | G05B 13/00 |
| 9,663,142 | B2 * | 5/2017 | Pastor | B62D 7/159 |
| 10,435,063 | B2 * | 10/2019 | Benak | B62D 6/00 |
| 11,400,970 | B2 * | 8/2022 | Namikawa | B62D 6/04 |
| 11,414,122 | B2 * | 8/2022 | Zheng | B62D 5/0463 |
| 11,447,175 | B2 * | 9/2022 | Collier-Hallman | |
| | | | | B62D 5/0481 |
| 11,485,404 | B2 * | 11/2022 | Anraku | B62D 5/006 |
| 11,807,322 | B2 * | 11/2023 | Bremkens | B62D 6/008 |
| 2003/0088351 | A1 * | 5/2003 | Augustine | B62D 6/008 |
| | | | | 180/443 |
| 2004/0236487 | A1 * | 11/2004 | Yao | B62D 6/002 |
| | | | | 180/443 |
| 2006/0080016 | A1 * | 4/2006 | Kasahara | B62D 6/008 |
| | | | | 701/41 |
| 2018/0304923 | A1 * | 10/2018 | Kilz | B62D 6/002 |
| 2019/0168807 | A1 | 6/2019 | Polmans | |
| 2020/0277004 | A1 * | 9/2020 | Zheng | B62D 5/0463 |
| 2020/0398891 | A1 * | 12/2020 | Szepessy | B62D 15/021 |
| 2021/0269087 | A1 * | 9/2021 | Zhao | B62D 15/021 |
| 2021/0284230 | A1 * | 9/2021 | Dobberphul | B62D 15/02 |
| 2021/0371007 | A1 * | 12/2021 | Collier-Hallman | B62D 6/002 |
| 2021/0394821 | A1 * | 12/2021 | Kakimoto | B62D 15/02 |
| 2023/0011119 | A1 * | 1/2023 | Uchino | B62D 6/008 |
| 2023/0017618 | A1 * | 1/2023 | Albrecht | B62D 5/006 |
| 2023/0037347 | A1 * | 2/2023 | Watanabe | B62D 5/0481 |
| 2023/0174149 | A1 * | 6/2023 | Nehls | B62D 6/008 |
| | | | | 701/41 |
| 2023/0249747 | A1 * | 8/2023 | Michelis | B62D 5/02 |
| | | | | 701/41 |

FOREIGN PATENT DOCUMENTS

| | | | | |
|---|---|---|---|---|
| CN | 113734276 | A * | 12/2021 | B62D 5/0481 |
| CN | 114728668 | A * | 7/2022 | B62D 5/006 |
| CN | 115402403 | A * | 11/2022 | |
| CN | 115593497 | A * | 1/2023 | B62D 15/0215 |
| CN | 111634325 | B * | 2/2023 | B62D 1/286 |
| CN | 115871780 | A * | 3/2023 | B62D 6/002 |
| CN | 115884914 | A * | 3/2023 | B62D 5/001 |
| CN | 116573037 | A * | 8/2023 | |
| CN | 116654084 | A * | 8/2023 | |
| CN | 116783110 | A * | 9/2023 | B62D 15/021 |
| CN | 115402403 | B * | 10/2023 | |
| CN | 116873036 | A * | 10/2023 | |
| CN | 116963956 | A * | 10/2023 | B60W 40/09 |
| CN | 114728668 | B * | 12/2023 | B62D 5/006 |
| DE | 103 02 268 | A1 | 7/2004 | |
| DE | 102004025029 | A1 * | 1/2005 | B62D 6/002 |
| DE | 60201478 | T2 * | 11/2005 | B62D 15/0245 |
| DE | 10359422 | B4 * | 2/2006 | B62D 6/002 |
| DE | 102004001318 | B4 * | 7/2006 | B62D 5/001 |
| DE | 102004025029 | B4 * | 10/2006 | B62D 6/002 |
| DE | 102004001320 | B4 * | 1/2007 | B62D 6/002 |
| DE | 10331700 | B4 * | 9/2008 | B62D 5/006 |
| DE | 10 2016 009 684 | A1 | 2/2018 | |
| DE | 102019127825 | A1 * | 4/2020 | B62D 15/024 |
| DE | 102019108166 | A1 * | 10/2020 | B62D 15/025 |
| DE | 102019131717 | B3 * | 2/2021 | |
| DE | 102019135047 | A1 * | 6/2021 | B62D 5/006 |
| DE | 102021113039 | A1 * | 12/2021 | B62D 5/0481 |
| DE | 102021214451 | B3 * | 11/2022 | |
| DE | 102021208838 | A1 * | 2/2023 | B62D 15/0205 |
| DE | 102021209079 | A1 * | 2/2023 | |
| DE | 102021132052 | A1 * | 6/2023 | B62D 5/001 |
| EP | 4101733 | A1 * | 12/2022 | B62D 15/025 |
| EP | 4101734 | A1 * | 12/2022 | B62D 5/006 |
| EP | 4137387 | A1 * | 2/2023 | B62D 15/0205 |
| ES | 2895639 | T3 * | 2/2022 | B62D 3/12 |
| FR | 3132498 | A1 * | 8/2023 | B62D 15/0215 |
| KR | 2022059015 | A * | 5/2022 | |
| WO | WO-2019052651 | A1 * | 3/2019 | B62D 15/021 |
| WO | WO-2019224156 | A1 * | 11/2019 | B62D 5/001 |
| WO | WO-2021122160 | A1 * | 6/2021 | B62D 5/006 |
| WO | WO-2022184194 | A1 * | 9/2022 | B62D 15/021 |
| WO | WO-2023174606 | A1 * | 9/2023 | |

OTHER PUBLICATIONS

German-language Written Opinion (PCT/ISA/237) issued in PCT Application No. PCT/EP2020/085086 dated Mar. 4, 2021 (six (6) pages).

German-language Search Report issued in German Application No. 10 2019 135 047.6 dated Aug. 13, 2020 with partial English translation (11 pages).

* cited by examiner

STEER-BY-WIRE STEERING SYSTEM, METHOD FOR OPERATING A STEER-BY-WIRE STEERING SYSTEM AND VEHICLE

BACKGROUND AND SUMMARY

The present invention relates to a steer-by-wire steering system for a vehicle, in particular for a motor vehicle, for steering at least one steerable vehicle wheel in a functionally installed state of the steer-by-wire steering system in a vehicle, wherein the steer-by-wire steering system has a steering input device for a steering input by a driver; a feedback actuator installation for generating a steering input dependent and/or driving state dependent, defined feedback steering torque at the steering input device; a steering assembly which is connectable to at least one steerable vehicle wheel and has a steering actuator installation; a control installation, and a feedback actuator monitoring installation. The feedback actuator monitoring installation in at least one operating state of the steer-by-wire steering system here is configured and specified for identifying at least one state of the feedback actuator installation, in particular at least one error state, and for generating and emitting a state signal, and the control installation in at least one operating state of the steer-by-wire steering system is configured and specified for actuating the steering actuator installation as a function of a steering input and as a function of a state of the feedback actuator installation.

The present invention furthermore relates to a method for operating such a steer-by-wire steering system.

Furthermore, the present invention relates to a vehicle, in particular a motor vehicle, having an aforementioned steer-by-wire steering system.

Steer-by-wire steering systems as well as corresponding methods for operating steer-by-wire steering systems, in particular methods for operating steer-by-wire steering systems in the event of a fault, for example from DE 10 2016 009 684 A1, as well as methods for synchronizing a position of the steering assembly with the steering input device, are known in principle from the prior art.

Inter alia it is known, for example from aforementioned DE 10 2016 009 684 A1, in the event of a failure of the feedback actuator installation and thus in an error state of the feedback actuator installation while driving and an associated decline in a steering torque generated at the steering input device by means of the feedback actuator installation and a consequential unintentional and undesirable excessive steering input by a driver, to attenuate, i.e. to reduce, or even completely suppress, an actuation of the steering actuator installation that is based on this excessive steering input in order to avoid an excessively intense, inappropriate vehicle reaction which is undesirable given the extent of the actual steering input, and ideally to initiate a vehicle reaction which corresponds to the actual intention of the driver. In the process, this can lead, inter alia, to a synchronization offset between the steering input device and one or a plurality of the steerable wheels being created, which can lead to the driver being confused. In some cases, as a consequence of the offset created, it may also be necessary to restrict the functionality of the steer-by-wire steering system and/or to have to completely switch off the latter, this being associated with limited availability and being undesirable.

Against this background, it is an object of the present invention to provide an alternative, in particular improved, steer-by-wire steering system, in particular a steer-by-wire steering system which is in particular easy to handle even in the event of a fault, and which moreover preferably additionally has a high level of availability. A further object of the present invention lies in providing a corresponding method for operating a corresponding steer-by-wire steering system as well as a vehicle having such a steer-by-wire steering system.

This object is achieved by a steer-by-wire steering system, by a method for operating a steer-by-wire steering system of this type, as well as by a vehicle having the steer0by-wire system, in accordance with the independent claims.

Advantageous as well as preferred design embodiments of the present invention are the subject matter of the dependent claims and will be explained in more detail hereunder. The wording of the claims is incorporated in the content of the description by explicit reference.

A steer-by-wire steering system according to the present invention is preferably configured for a vehicle, in particular for a motor vehicle, and for steering at least one steerable vehicle wheel in a functionally installed state of the steer-by-wire steering system in a vehicle, wherein a steer-by-wire steering system according to the invention has a steering input device for a steering input by a driver; a feedback actuator installation for generating a steering input dependent and/or driving state dependent, defined feedback steering torque at the steering input device; a steering assembly which is connectable to at least one steerable vehicle wheel and has a steering actuator installation; a control installation; and a feedback actuator monitoring installation. The feedback actuator monitoring installation in at least one operating state of the steer-by-wire steering system here is configured and specified for identifying at least one state of the feedback actuator installation, in particular at least one error state, and for generating and emitting a state signal, in the case of an error preferably an error signal, in particular to the control installation. The control installation in at least one operating state of the steer-by-wire steering system is configured and specified for actuating the steering actuator installation as a function of a steering input and as a function of a state of the feedback actuator installation, in particular as a function of a current state of the feedback actuator installation.

A steer-by-wire steering system according to the present invention here is characterized in that the steer-by-wire steering system furthermore has a synchronization monitoring installation, wherein the synchronization monitoring installation in at least one operating state of the steer-by-wire steering system is configured and specified for determining a synchronization offset, in particular a current synchronization offset, between a current position of the steering input device and a current position of the steering assembly, the steering actuator installation and/or the at least one steerable vehicle wheel, and wherein the control installation in at least one operating state of the steer-by-wire steering system is furthermore configured and specified for actuating the steering actuator installation furthermore as a function of the synchronization offset determined by the synchronization monitoring installation, in particular, preferably additionally, as a function of the current synchronization offset.

The actuation of the steering actuator installation as a function of a steering input and as a function of a state of the feedback actuator installation, in particular as a function of a current state of the feedback actuator installation, enables a particularly advantageous steer-by-wire steering system to be provided, in particular a steer-by-wire steering system which enables the steering actuator installation to be actuated differently in different states of the feedback actuator installation, for example actuating the steering actuator installation in an error state of the feedback actuator installation differently than in an error-free state of the feedback actuator installation. Assuming a suitable actuation of the steering actuator installation in the respective states, a steer-by-wire system which can be particularly well handled can be provided as a result.

If a synchronization offset between a current position of the steering input device and a current position of the steering assembly, the steering actuator installation and/or the at least one steerable vehicle wheel is created during an operation of the steer-by-wire steering system, a steer-by-wire steering system configured according to the invention enables a correction of this synchronization offset, in some cases even complete (re)balancing of the synchronization offset created, in particular during an operation of the steer-by-wire steering system. As a result, switching off the steer-by-wire steering system, or an emergency operation of the latter, can be avoided in many cases, this having an advantageous effect on the availability, the latter being able to be significantly improved as a result.

A "synchronization offset" in the context of the invention is presently understood in particular to be a relative offset between the position of the steering input device and the position of the steering assembly, the steering actuator installation and/or the at least one steerable wheel, in each case relative to the respective movement travel present.

A synchronization offset between a current position of the steering input device and a current position of the steering assembly during the operation of a steer-by-wire steering system according to the invention can be created, for example, when the steering assembly, in particular the steering actuator installation and/or at least one steerable wheel, cannot follow a steering movement and thus a position of the steering input device during a steering input which proceeds from an initial position, for example a straight-ahead position, and the steering input device as a consequence for example travels 50% of a potential steering input travel during a steering input, while the steerable wheels wrongly travel only 45% instead of the targeted 50%. If a steering input in which the steering input device is moved back by 50% of the available steering input travel in the opposite direction is now subsequently applied, and if the steerable wheels can follow this time, this leads to a wheel steering movement beyond the initial position while the steering input device after the second steering input is back in the initial position again. A synchronization offset manifests itself in particular in a so-called off-center steering wheel, i.e. a position of the steering input device that is angled when the steerable wheels point straight ahead.

Likewise, a synchronization offset can be created, for example, when the feedback actuator installation fails and switches to an error state and a driver consequently performs an inappropriate and excessively intense steering input which is in particular caused by a sudden failure of the feedback actuator installation and, associated therewith, sudden decline in the steering torque at the steering input device, and this inappropriate intense steering input is however only attenuated, i.e. implemented only by way of a reduced wheel steering angle in comparison to a wheel steering angle which is actually to be implemented in the event of a steering input of this type, and the steering input device relative to the available steering input travel is consequently situated at a different position than a steerable vehicle wheel relative to the total available wheel turning angle.

A steer-by-wire steering system according to the invention here can in principle be configured for a single-track motor vehicle as well as for a dual-track motor vehicle. A correspondingly suitable steering assembly is to be chosen according to the type of vehicle for which the steering system is to be intended.

A steer-by-wire steering system according to the present invention here can in principle be configured having a mechanical fallback plane as well as without the latter, wherein a mechanical fallback plane, if present, preferably enables a complete mechanical decoupling of the steering input device from the steering assembly, for example with the aid of a correspondingly suitable clutch.

The steering input device of a steer-by-wire steering system according to the invention can be configured in different ways and have or be, for example, a steering wheel, a joystick, or else comprise one or a plurality of steering horns or the like. The steering input device only needs to be suitable for a steering input by a driver, wherein a steering input in the context of the invention in the present case is preferably understood to be the application of a steering request by a driver by means of the steering input device, in particular by a corresponding movement of the steering input device.

The feedback actuator installation of a steer-by-wire steering system according to the invention here is in particular configured for generating a resisting torque and/or restoring torque at the steering input device, in particular as a function of an applied steering input and/or a current driving state. As a result, a particularly advantageous return of the steering can be achieved, in particular adjusted, in particular in an error-free state of the steer-by-wire steering system, and thus a particularly pleasant steering sensation.

A driving state in the context of the present invention is in particular a vehicle state or a characteristic driving maneuver, for example driving straight ahead, negotiating curves, drifting, a braking maneuver, an evasive maneuver, an acceleration procedure, a parking maneuver or a turning maneuver which can preferably be characterized by one or a plurality of driving state variables such as, for example, a vehicle speed, a longitudinal, transverse and/or vertical acceleration, a yaw angle and/or a yaw rate, a pitch angle and/or a pitch rate, a roll angle and/or a roll rate and/or a slip angle, wherein one or a plurality of the aforementioned driving states and/or driving maneuvers here can be further categorized, for example by characterizing the vehicle speed arising therein. For example, driving straight ahead can be categorized as driving straight ahead at high speed, at average speed or at moderate speed or a parking speed, wherein a high speed can be, for example, a vehicle speed $v_x$ of more than 150 km/h, whereas 80 km/h$\leq v_x \leq$150 km/h preferably applies to an average speed, 25 km/h$\leq v_x <$80 km/h preferably applies to a moderate speed, and $v_x <$25 km/h applies in particular to a parking speed.

The steering assembly of a steer-by-wire steering system according to the invention can in particular comprise a steering gear and/or tie rods and optionally further transmission elements such as, for example, further control arms, gearbox components or the like.

In order to determine a position of the steering input device, a steer-by-wire steering system according to the invention furthermore preferably has a position determining installation for determining a position of the steering input device, for example an absolute-measuring steering angle sensor, in particular when the steering input device is a steering wheel.

In order to determine a position of the steering actuator installation, a steer-by-wire steering system according to the invention furthermore preferably has a position determining installation for determining a position of the steering assembly, the steering actuator installation and/or at least one steerable vehicle wheel which in a functionally installed state in a vehicle is in particular connected to the steering assembly. The determining of the position of the steering assembly in a steering assembly having a rack-and-pinion steering gear can take place with the aid of a position determining installation for determining a position of a rack, for example. The determining of the position of the steering actuator installation can take place with the aid of a position determining installation for determining a rotor angle of a rotor of an associated steering actuator, for example. The determining of the position of a steerable wheel can take place with the aid of a calculation based on a single-track model, for example, in particular as a function of a steering angle which is detected by means of an absolute-measuring steering angle sensor on a steering gear proximal steering shaft.

A feedback monitoring installation in the context of the present invention is understood to be an installation which has at least one function for monitoring, in particular for identifying, at least one state of the feedback actuator device in at least one operating state. Accordingly, a synchronization monitoring installation is an installation which has at least one function for monitoring, in particular for determining, a current synchronization offset between a current position of the steering input device and a current position of the steering assembly, the steering actuator installation and/or the at least one steerable vehicle wheel.

The feedback monitoring installation and/or the synchronization monitoring installation of a steer-by-wire steering system according to the invention here can in each case be separately configured, for example as a separate control apparatus, or else alternatively also be integrated, in particular conjointly or else individually, in the control installation or in another control installation or another component. In some cases, it can be particularly advantageous for the feedback monitoring installation to be integrated in the feedback actuator installation, for example, and/or for the synchronization monitoring installation to be integrated in the steering actuator installation. The feedback monitoring installation and/or the synchronization monitoring installation can in each case also be distributed among a plurality of control installations, in particular a plurality of control apparatuses and/or components.

A control installation in the context of the invention is in particular an installation for at least partially or completely controlling at least one component, in particular for at least partially or completely controlling a component of a steer-by-wire steering system according to the invention, wherein the control installation has at least one function for at least partially or completely controlling at least one component. The control installation of a steer-by-wire steering system according to the invention here can be separately configured, for example as a separate control apparatus, or else alternatively be integrated with one or a plurality of other monitoring and/or controlling installations in a common control apparatus, for example in a central chassis control apparatus. Moreover, individual functions and/or components, in particular individual hardware components of the control installation, can also be distributed among a plurality of control installations, in particular a plurality of control apparatuses.

A steer-by-wire steering system according to the invention as a function of a steering input of a driver is preferably configured and specified for determining a corresponding steering request, on the one hand.

Particularly preferably, a steer-by-wire steering system according to the invention, in particular the control installation of a steer-by-wire steering system according to the invention, is furthermore configured and specified for, in particular automatically, determining a steering request in a self-acting manner, i.e. independently of a steering input of a driver, i.e. in particular so as not to be reliant on a steering input of a driver. However, a steering request can also be received by another control installation. This enables a steer-by-wire steering system which enables autonomous driving to be provided in a particularly simple manner.

Particularly preferably, a steer-by-wire steering system according to the invention, in particular the control installation, is furthermore configured for detecting a driver choice in terms of a driving mode, wherein the driver can in particular choose between a manual steer-by-wire operating mode and an autonomous steer-by-wire operating mode, wherein the control installation, depending on a detected driver choice, is in particular configured and specified for correspondingly actuating the steering actuator installation and/or the feedback actuator installation. A particularly user-friendly steer-by-wire steering system can be provided as a result.

In a particularly preferred design embodiment of a steer-by-wire system according to the invention, the steering system is in particular configured in the autonomous steer-by-wire operating mode for retracting the steering input device, in particular for preferably stowing the latter in an instrument panel or the like in the dashboard, for example with the aid of a telescopic rod or the like, and in the manual steer-by-wire operating mode for correspondingly deploying the steering input device to a steering position. A particularly user-friendly steer-by-wire steering system can be provided as a result.

In order to avoid that the steering input device conjointly moves, in particular conjointly rotates, in the autonomous steer-by-wire operating mode, locking of the steering input device can in particular be effected in a steer-by-wire steering system according to the invention, wherein the steering input device can preferably be locked. A particularly user friendly steer-by-wire steering system can be provided as a result.

In an advantageous design embodiment of a steer-by-wire steering system according to the present invention, the control installation in at least one operating state is furthermore configured and specified for, in particular additionally, actuating the steering actuator installation as a function of a driving state, preferably as a function of a current driving state. A particularly advantageous steer-by-wire steering system, in particular a steer-by-wire steering system which can be particularly well handled, can be provided as a result.

To this end, the steer-by-wire steering system furthermore preferably has a driving state identification installation which is in particular configured and specified for detecting and/or determining at least one driving state variable, preferably at least a vehicle speed, a transverse acceleration, a longitudinal acceleration, a yaw rate and/or a slip angle, wherein the driving state identification installation, as a function of at least one detected or determined driving state variable, furthermore particularly is configured and specified for identifying a driving state. Moreover, in some cases it can be advantageous and/or necessary to detect even further driving state variables such as, for example, a yaw angle and/or a yaw rate, a pitch angle and/or a pitch rate, a roll angle and/or a roll rate. This enables a particularly advantageous actuation of the steering actuator installation as a function of a driving state.

Particularly preferably, a steer-by-wire system according to the invention, in particular the driving state identification, is configured and specified here for furthermore generating and preferably emitting, in particular to the control installation, at least one driving state signal which characterizes the identified driving state, the control installation being preferably configured for receiving and/or further processing the at least one driving state signal. This enables the steering actuator installation to be actuated in a particularly simple manner as a function of a driving state.

Particularly preferably, the control installation in at least one operating state is configured and specified for actuating the steering actuator installation as a function of a steering input and as a function of a state of the feedback actuator installation and as a function of a driving state, in particular as a function of at least one driving state signal, and/or in at least one operating state is configured and specified for actuating the steering actuator installation at least as a function of a steering input and as a function of a synchronization offset and as a function of a driving state, in particular as a function of at least one driving state signal.

In a further advantageous design embodiment of a steer-by-wire steering system according to the present invention, the control installation in at least one operating state of the steer-by-wire steering system is in particular configured and specified for actuating the steering actuator installation as a function of an applied steering input and of at least one determined correction variable, in particular as a function of a steering input correction variable and/or a driving state correction variable and/or a synchronization offset correction variable, for connecting the defined wheel steering movement to be actually implemented, preferably as a function of a state of the steer-by-wire steering system, in particular as a function of an in particular current state of the feedback actuator installation, an in particular current driving state, and/or an in particular current synchronization offset. An adaptation, in particular a correction, of the actuation of the steering actuator installation can be performed in a particularly simple manner by means of a correction variable, so as to effect an appropriate wheel steering movement, in particular a wheel steering movement appropriate for the respective situation, in particular a wheel steering movement which is more appropriate and better matches the respective situation.

Each correction variable here can in particular be a reduction variable, i.e. have an effect that reduces the actual actuation, or be an amplification variable and have an effect amplifying the actual actuation, or else in some cases have a neutral effect, i.e. having been determined in such a manner that this results in neither a reducing nor an amplifying effect on the actual, original, non-corrected actuation.

Each correction variable here is either, for example, a linear offset, a linear or nonlinear factor, a function or a map or a combination thereof, wherein one or a plurality of correction variables can particularly preferably be determined at least for an operating state and/or at least one driving state as a function of one or a plurality of parameters which are capable of data input and/or can be applied and which can in each case be stored. A positive adaptation of the actuation of the steering actuator installation can be achieved in a simple manner as a result.

In a further advantageous design embodiment of a steer-by-wire steering system according to the present invention, the control installation is particularly configured and specified for determining at least one steering input correction variable, preferably at least partially as a function of a steering input travel, a steering input velocity and/or a steering input acceleration. A particularly positive adaptation or correction of the actuation of the steering actuator installation can be achieved as a result. A positive adaptation/correction and consequently a positive actuation which approximates an actual driver choice can be achieved in particular with the aid of the steering input velocity and/or the steering input acceleration, because the steering input velocity and/or the steering input acceleration, in particular in conjunction with the exact time at which the error state of the feedback actuator installation has arisen, in particular in the event of a failure of the feedback actuator installation, represent/represents a good measure for how abruptly and suddenly the steering input has taken place after the error state of the feedback actuator installation has arisen, wherein a steering input performed after the error state has arisen, in particular in the case of a large difference in terms of these variables prior to the error state arising and when the error state of the feedback actuator installation arises and/or directly thereafter, with a high degree of probability has a large undesirable part such that an intense correction preferably takes place in this case, while in the case of an only minor difference in terms of these variables an only small undesirable proportion of the steering input can in particular be assumed, the latter requiring only minor correction.

A "steering input travel" in the context of the present invention is understood here to be the movement travel of the steering input device which is in each case covered during a steering input, wherein the steering input travel here in principle is a function of the type and the design embodiment of the respective steering input device and can be, for example, a steering angle, for example in the case of a rotatably mounted steering input device such as a steering wheel or the like. In the case of a slide as a steering input device however, the steering input travel is preferably a straight distance.

Accordingly, the "steering input velocity" is understood to be the variation of the steering input travel over time, i.e. the first derivative of the steering input travel according to time.

Accordingly, the "steering input acceleration" is understood to be the variation of the steering input velocity over time, i.e. the second derivative of the steering input travel according to time.

In a further advantageous design embodiment of a steer-by-wire steering system according to the present invention, the control installation is in particular configured and specified for determining at least one steering input correction variable at least partially or completely as a function of a steering input performed and detected prior to an error state of the feedback actuator installation arising, and/or at least partially or completely as a function of a steering input performed and detected during an error state of the feedback actuator installation. A particularly positive adaptation or correction of the actuation of the steering actuator installation can be achieved as a result, and an ideally appropriate wheel steering movement which corresponds to an actual driver choice can be effected despite a potentially inappropriate steering input which does not correspond to an actual driver choice. In this way, a positive conclusion in terms of an actually desired steering input which can particularly preferably be used as a basis for determining at least one steering input correction variable can in particular be drawn in many cases.

In a further advantageous design embodiment of a steer-by-wire steering system according to the present invention, the control installation is preferably configured and specified for determining at least one driving state correction variable, preferably at least partially or completely as a function of at least one detected driving state variable, in particular as a function of a vehicle speed, a transverse acceleration, a longitudinal acceleration, a yaw rate and/or a slip angle. Moreover, in some cases it can be advantageous and/or necessary to detect even further driving state variables such as, for example, a yaw angle and/or a yaw rate, a pitch angle and/or a pitch rate, a roll angle and/or a roll rate. This enables a particularly advantageous, corrected actuation of the steering actuator installation as a function of a driving state.

In a further advantageous design embodiment of a steer-by-wire steering system according to the present invention, the control installation is in particular configured and specified for determining at least one driving state correction variable at least partially or completely as a function of a driving state detected prior to an error state of the feedback actuator installation arising and/or at least partially or completely as a function of a driving state detected during an error state of the feedback actuator installation. A particularly positive adaptation or correction of the actuation of the steering actuator installation can be achieved as a result.

In a further advantageous design embodiment of a steer-by-wire steering system according to the present invention, the control installation is furthermore preferably configured and specified for determining at least one offset correction variable, in particular at least partially as a function of a variable of the synchronization offset, an absolute position of the steering input device and/or an absolute position of the steering assembly, the steering actuator installation and/or the at least one steerable vehicle wheel. A rapid synchronization which is adapted to the situation can be achieved in a particularly simple and advantageous manner as a result.

Particularly preferably, the control installation of a steer-by-wire steering system according to the invention in at least one error-free state of the feedback actuator installation here is configured and specified for actuating the steering actuator installation in such a manner that a non-corrected predefined wheel steering movement is effected in response to a steering input performed in the error-free state of the feedback actuator installation. If the associated correction variable is a factor here, the correction factor here is preferably 1, in the case of an offset preferably 0.

In a further advantageous design embodiment of a steer-by-wire steering system according to the present invention, the control installation in at least one error state of the feedback actuator installation is in particular configured and specified for actuating the steering actuator installation in such a manner, in particular as a function of at least one steering input correction variable and/or at least one driving state correction variable, that a corrected wheel steering movement, in particular a reduced wheel steering movement or no wheel steering movement, is effected in response to a steering input performed in the error state of the feedback actuator installation. This has proven particularly advantageous because "oversteer" arises in most cases when an error state of the feedback actuator installation arises, in particular in the event of a failure when the steering torque suddenly declines, this "oversteer" being able to be reduced as a result or in some cases even being able to be entirely avoided.

A "reduced wheel steering movement" in the present case here is understood to be a wheel steering movement which is less, in particular less in a defined manner, preferably less by a correction variable, in comparison to a defined wheel steering movement which in an error-free state of the feedback actuator installation is to be actually implemented as a response to the performed steering input. If the associated correction variable here is a factor, the correction factor here is preferably less than 1, in the case of an offset preferably less than 0.

If no wheel steering movement is effected, the wheel steering movement is suppressed, i.e. the steering actuator installation is in particular actuated in such a manner that no wheel steering movement is effected.

Particularly preferably, the steering actuator installation here can be actuated as a function of at least one steering input correction variable and/or at least one driving state correction variable, wherein the at least one steering input correction variable and/or the at least one driving state correction variable are/is in particular chosen in such a manner that the desired, corrected wheel steering movement is effected as a response to the steering input performed in the error state of the feedback actuator installation.

An actuation of the steering actuator installation as a function of a driving situation can be achieved in a simple manner by a correction as a function of the driving state, in particular in an error state of the feedback actuator installation, and a more targeted and more reliable actuation can thus be achieved. For example, the risk of a steering input, and thus a driver choice, being wrongly suppressed or implemented in an undesirably excessive manner in specific situations, for example when negotiating a curve, which is potentially dangerous during dynamic driving on a winding highway, for example, can be reduced or even entirely avoided as a result.

In a further advantageous design embodiment of a steer-by-wire steering system according to the present invention, the control installation in an error-free state of the feedback actuator installation, in particular only in an error-free state of the feedback actuator installation, is in particular configured and specified for actuating the steering actuator installation as a function of a steering input and as a function of a synchronization offset and/or an offset correction variable. A rapid "resynchronization" and thus a higher error-free availability of a steer-by-wire steering system according to the invention can be achieved as a result.

In a further advantageous design embodiment of a steer-by-wire steering system according to the present invention, the control installation is preferably configured and specified for actuating the steering actuator installation as a function of a synchronization offset and/or an offset correction variable in such a manner that as a response to a steering input performed in the event of an existing synchronization offset in the error-free state of the feedback actuator installation, a wheel steering movement which is corrected in comparison to a defined wheel steering movement which in an error-free state of the feedback actuator installation without a synchronization offset is to be actually implemented as a response to the performed steering input, in particular a corrected wheel steering movement which leads to a reduction of the synchronization offset, is effected. Particularly simple and advantageous actuation of the steering actuator installation can be achieved as a result.

The steering actuator installation here can preferably be actuated as a function of at least one offset correction variable, wherein the offset correction variable is particularly preferably chosen in such a manner that the desired, corrected wheel steering movement which reduces the offset is effected in response to a steering input performed in the error-free state of the feedback actuator installation.

In a further advantageous design embodiment of a steer-by-wire steering system according to the present invention, the control installation is preferably configured and specified for actuating the steering actuator installation as a function of a synchronization offset and/or an offset correction variable in such a manner that a corrected wheel steering movement is effected, the latter, when reaching a reference position of the steering input device, in particular when reaching a straight-ahead position of the steering input device, leading to a synchronization offset being balanced, wherein the offset correction variable is preferably chosen in such a manner that the desired, corrected wheel steering movement which balances the offset is effected in response to a steering input performed in the error-free state of the feedback actuator installation.

In a further advantageous design embodiment of a steer-by-wire steering system according to the present invention, the steer-by-wire steering system is particularly preferably configured in such a manner that a wheel steering movement for reducing a synchronization offset is able to be effected only during or as a direct consequence of a steering input applied by a driver. That is to say that a wheel steering movement is in principle preferably able to be effected only during a steering input. As a result, a sensation of a "self-driving car" can be avoided, as a result of which a high sense of safety for a driver can be generated and a high level of acceptance of the steer-by-wire steering system can be achieved.

In a further advantageous design embodiment of a steer-by-wire steering system according to the present invention, the steer-by-wire steering system is furthermore particularly configured in such a manner that a wheel steering movement for reducing a synchronization offset is able to be effected only in the same direction as a steering input applied by the driver. That is to say that a wheel steering movement is in principle preferably possible only in the same direction. As a result, a confusing resultant vehicle reaction counter to the steering input and/or a sensation of a "self-driving car" can be avoided, as a result of which a high sense of safety for a driver can be generated and a high level of acceptance of the steer-by-wire steering system can be achieved.

A method according to the invention for operating a steer-by-wire steering system according to the present invention which is functionally installed in a vehicle, wherein at least one steerable vehicle wheel is connected to the steering actuator installation of the steering assembly, is characterized by the following steps:

checking the state of the feedback actuator installation, in particular by means of the feedback actuator monitoring installation; and actuating the steering actuator installation, in particular by means of the control installation, as a function of a steering input and as a function of the state of the feedback actuator installation.

In an advantageous embodiment of a method according to the present invention, when an error state of the feedback actuator installation has been identified, it is preferable for the steering actuator installation to be preferably actuated in such a manner, in particular by means of the control installation, that a corrected wheel steering movement, in particular a reduced wheel steering movement or no wheel steering movement, is effected, wherein the steering actuator installation to this end is furthermore preferably actuated as a function of at least one steering input correction variable and/or a driving state correction variable. This has proven particularly advantageous because "oversteer" arises in most cases when an error state of the feedback actuator installation arises, in particular in the event of a failure when the steering torque suddenly declines, this "oversteer" being able to be reduced as a result or in some cases even being able to be entirely avoided. Alternatively however, an amplified wheel steering movement can be advantageous in some cases.

In a further advantageous embodiment of a method according to the present invention, when an error-free state of the feedback actuator installation has been identified, it is preferable for a synchronization offset between a current position of the steering input device and a current position of the steering actuator installation and/or of the at least one steerable vehicle wheel to be determined, in particular by means of the synchronization monitoring installation, in particular in a further step, and should a synchronization offset be present, for the steering actuator installation to be furthermore actuated as a function of the synchronization offset determined by the synchronization monitoring installation, preferably as a function of a synchronization offset and an offset correction variable.

Preferably, in particular in an error-free state of the feedback actuator installation, in particular only in an error-free state of the feedback actuator installation, the steering actuator installation here is actuated as a function of a steering input and as a function of a synchronization offset and/or an offset correction variable. A rapid "resynchronization" and thus a higher error-free availability of a steer-by-wire steering system according to the invention can be achieved as a result.

Particularly preferably, the steering actuator installation here is actuated as a function of a synchronization offset and/or an offset correction variable in such a manner that as a response to a steering input performed in the event of an existing synchronization offset in the error-free state of the feedback actuator installation, a wheel steering movement which is corrected in comparison to a defined wheel steering movement which in an error-free state of the feedback actuator installation without a synchronization offset is to be actually implemented as a response to the performed steering input, in particular a corrected wheel steering movement which leads to a reduction of the synchronization offset, is effected. Particularly simple and advantageous actuation of the steering actuator installation can be achieved as a result.

The steering actuator installation here is preferably actuated as a function of at least one offset correction variable, wherein the offset correction variable is particularly preferably chosen in such a manner that the desired, corrected wheel steering movement which reduces the offset is effected in response to a steering input performed in the error-free state of the feedback actuator installation.

Preferably, the steering actuator installation as a function of a synchronization offset and/or an offset correction variable is actuated in such a manner that a corrected wheel steering movement is effected, the latter, when reaching a reference position of the steering input device, in particular when reaching a straight-ahead position of the steering input device, leading to a synchronization offset being balanced, wherein the offset correction variable is preferably chosen in such a manner that the desired, corrected wheel steering movement which balances the offset is effected in response to a steering input performed in the error-free state of the feedback actuator installation. This enables a particularly user-friendly synchronization and is less confusing to a driver.

It is particularly advantageous for a wheel steering movement for reducing a synchronization offset to able to be effected only during or as a direct consequence of a steering input applied by a driver. That is to say that a wheel steering movement is in principle preferably effected only during a steering input. As a result, a sensation of a "self-driving car"

can be avoided, as a result of which a high sense of safety for a driver can be generated and a high level of acceptance of the steer-by-wire steering system can be achieved.

Furthermore preferably, a wheel steering movement for reducing a synchronization offset here is effected, in particular at all times, only in the same direction as a steering input applied by the driver. That is to say that a wheel steering movement is in principle preferably only implemented in the same direction. As a result, a confusing resultant vehicle reaction counter to the steering input and/or a sensation of a "self-driving car" can be avoided, as a result of which a high sense of safety for a driver can be generated and a high level of acceptance of the steer-by-wire steering system can be achieved.

An inventive vehicle according to the present invention can in particular be a motor vehicle and is characterized in that the vehicle has a steer-by-wire steering system which is configured according to the present invention and/or which is configured for carrying out a method according to the invention.

The advantageous design embodiments and the advantages thereof described in the context of a steer-by-wire steering system according to the invention apply in an analogous manner also to a method according to the invention as well as to a vehicle according to the invention, and vice versa.

The aforementioned and further features emerge not only from the claims and from the description but also from the drawings, where the individual features can be realized in each case by themselves or as a plurality in the form of subcombinations in an embodiment of the invention and can constitute advantageous and inherently protectable embodiments to the extent that these embodiments are technically feasible.

The invention will be explained in more detail hereunder by means of a preferred but not limiting exemplary embodiment of a steer-by-wire steering system according to the invention as well as by means of an exemplary embodiment of a method according to the invention, wherein the invention is illustrated schematically and to some extent in a highly simplified manner in the appended figures.

DETAILED DESCRIPTION OF THE DRAWINGS

Figure 1:
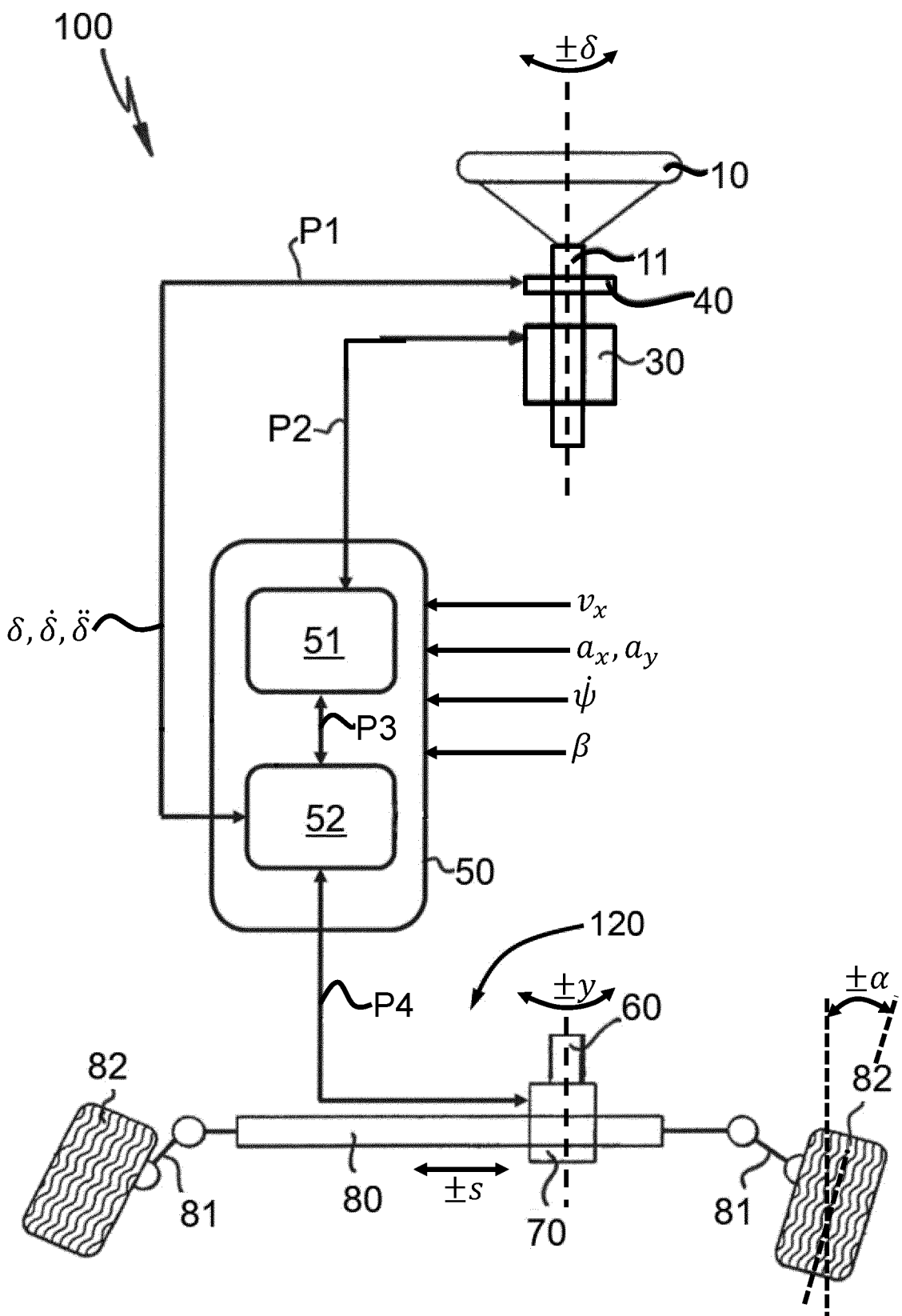
FIG. 1 is a diagrammatic illustration of a fundamental schematic construction of an exemplary embodiment of a steer-by-wire steering system according to the invention.

FIG. 1, in a diagrammatic illustration, shows in an exemplary manner a schematic construction of a first exemplary embodiment of a steer-by-wire steering system 100 according to the invention, which has a steering input device 10 which in this exemplary embodiment of a steer-by-wire steering system 100 according to the invention is a steering wheel 10 which is connected in a rotationally fixed manner to a driver proximal, or steering wheel proximal, steering shaft 11 and by way of which a steering request, i.e. a desired steering input, in this case a steering input desired by the driver, in this case a steering wheel angle δ, can be applied by a corresponding movement, in this case by a rotation about the rotation axis of the steering wheel proximal steering shaft 11.

The steer-by-wire steering system 100 furthermore has a feedback actuator installation 30, a control installation 50 as well as a steering assembly 120.

In this exemplary embodiment of a steer-by-wire steering system 100, a defined feedback steering torque, in particular a resisting steering torque and/or a restoring torque, can be generated at the steering input device 10 by means of the feedback actuator installation 30. A haptic response, in particular a haptic feedback, to the driver can thus be generated, as a result of which a particularly advantageous steering sensation can be achieved, in particular a steering sensation which is similar or comparable to that of a conventional, mechanical steering system.

In order for the feedback steering torque to be generated, the feedback actuator installation 30 can be correspondingly actuated by the control installation 50, in particular by way of a signal and communication path P2, wherein the feedback steering torque in this exemplary embodiment of a steer-by-wire steering system 100 according to the invention can be generated in particular as a function of the steering angle δ applied by way of the steering wheel 10 and as a function of a plurality of driving state variables such as, for example, a vehicle speed $v_x$, a longitudinal and/or transverse acceleration $a_x$ or $a_y$, respectively, a yaw rate $\dot{\psi}$ and/or a slip angle β. The steering angle δ in this case can be detected by means of an absolute-measuring steering angle sensor 40 and by way of a signal and communication path P1 transmitted to the control installation 50.

The steer-by-wire steering system 100 furthermore has a steering assembly 120 which in this exemplary embodiment of a steer-by-wire steering system 100 has a wheel proximal or steering gear proximal, respectively, steering shaft 60 which at the one end thereof, in this case the wheel proximal end, is mechanically coupled to a rack of a steering gear 80, the rack in turn by way of a left tie-rod 81 and a right tie-rod 81 being connected to the steerable wheels 82 of a vehicle, for example to the steerable front wheels. The steering assembly 120 furthermore comprises a steering actuator installation 70 by means of which a steering movement of the steerable wheels 82, in particular pivoting of the steerable wheels 82, in particular by a wheel steering angle α, can be effected, in particular according to a nominal specification determined by the control installation 50, the latter in this exemplary embodiment by way of a signal path P4 for signals and communications being connected to the steering actuator installation 70.

The control installation 50 here is in particular configured and specified for actuating the steering actuator installation 70 in such a manner that a desired wheel steering movement is effected, wherein the control installation 50 in this exemplary embodiment of a steering system 100 here is configured for actuating the steering actuator installation 70 as a function of a steering input applied by a driver, in particular as a function of an applied steering input travel, in this case an applied steering angle δ, as well as, preferably in another operating mode of the steer-by-wire steering system 100, in particular in an "autonomous driving mode", is configured for per se determining a corresponding steering request, in particular in the absence of active steering by the driver, so that highly automated, or autonomous, respectively, driving is also possible with this steer-by-wire steering system 100.

The nominal specification for actuating the steering actuator installation 70 in this exemplary embodiment of a steer-by-wire steering system 100 here is determined with the aid of corresponding stored functions, parameters and maps which are in particular capable of data input and/or can be applied, in particular as a function of a steering input applied by a driver or an automatically determined steering request, as well as a function of a detected driving state, or as a function of one or a plurality of detected driving state variables such as, for example, the vehicle speed $v_x$, the longitudinal and/or transverse acceleration $a_x$ or $a_y$, respectively, the yaw rate $\dot{\psi}$ and/or the slip angle $\beta$, and/or as a function of one or a plurality of further state variables.

The gearing ratio between an applied steering input, in this case an applied steering angle $\delta$, and a resultant, effected wheel steering movement $\alpha$ here does not have to be constant but, by virtue of the absent mechanical connection between the steering input device 10 and the steerable wheels 82, can in each case be adapted to a current driving situation, this being able to be achieved in a simple manner by correspondingly actuating the steering actuator installation 70.

According to the invention, the steer-by-wire steering system 100 furthermore has a feedback actuator monitoring installation 51 which for monitoring the feedback actuator installation 30 is configured and specified for identifying at least one state of the feedback actuator installation 30, in particular at least one error state, and in the event of an error for preferably transmitting an error signal to the control installation 50, wherein the feedback actuator monitoring installation 51 in this exemplary embodiment is integrated in the control installation 50. Alternatively, the feedback actuator monitoring installation 51 could also be integrated in the feedback actuator installation 30, for example, or another control installation not shown here.

According to the present invention, the control installation 50 in at least one operating state of the steer-by-wire steering system 100 is furthermore configured and specified for actuating the steering actuator installation 70 as a function of a steering input and as a function of a state of the feedback actuator installation 30, wherein the control installation 50 in this steer-by-wire steering system 100 in an error state of the feedback actuator installation 30 is configured and specified for actuating the steering actuator installation 70 as a function of at least one steering input correction variable and at least one driving state correction variable in such a manner that a corrected wheel steering movement, in particular a reduced wheel steering movement or no wheel steering movement is caused as a response to a steering input performed in the error state of the feedback actuator installation 30. As a result, in a particularly simple manner, any unintentional "oversteer" when an error state of the feedback actuator installation arises, in particular in the event of a failure, when the steering torque suddenly declines, can be reduced, or even be entirely balanced or suppressed in some cases, and an undesirable vehicle reaction which is inappropriate, or optionally even dangerous, for the respective driving situation can be avoided.

For a particularly advantageous actuation of the steering actuator installation in the event of an error, the control installation 50 in this steer-by-wire steering system 100 here is configured and specified for determining at least one steering input correction variable as a function of the applied steering angle $\delta$, a steering angle velocity $\dot{\delta}$ as well as a steering input acceleration $\ddot{\delta}$, wherein at least one steering input correction variable here can in each case be determined as a function of a steering angle $\delta$ detected over a defined time prior to the error state arising, a steering angle velocity $\dot{\delta}$ detected over a defined time prior to the error state arising, and a steering angle acceleration $\ddot{\delta}$ detected over a defined time prior to the error state arising, as well as in each case as a function of a steering angle $\delta$ detected over a defined time when or after the error state arises, a steering angle velocity $\dot{\delta}$ detected in this time, and a steering angle acceleration $\ddot{\delta}$ detected in this time. As a result, a particularly positive wheel steering movement which is adapted to an actually desired steering input can be effected.

Because a synchronization offset can arise during the operation of an aforedescribed steer-by-wire steering system 100, this synchronization offset potentially having a negative effect on the availability of the steering system 100, the steer-by-wire steering system 100 furthermore has a synchronization monitoring installation 52 which according to the invention in at least one operating state of the steer-by-wire steering system 100 is configured and specified for determining a synchronization offset between a current position of the steering input device 10 and a current position of the steering assembly 120, in this exemplary embodiment of the rack, and the steering actuator installation 70, in this case of an associated steering actuator, and for actuating the steering actuator installation 70 as a function of the synchronization offset determined by the synchronization monitoring installation 52.

In order for the position of the steering assembly and the steering actuator installation to be determined, this exemplary embodiment of a steer-by-wire steering system 100 furthermore has in each case corresponding position determining installations not illustrated here, in particular a position determining installation for determining an absolute position s of the rack and for determining a rotor position, in particular a rotor angle y of the steering actuator.

The synchronization monitoring installation 52 in this exemplary embodiment is likewise integrated in the control installation 50, wherein the two monitoring installations 51 and 52 in the present case are also connected to one another for signals and communications by way of a signal path P3. Alternatively however, the synchronization monitoring installation 52 could also be integrated in the steering actuator installation 70 or another control installation not shown here, for example.

The control installation 50 presently is configured and specified for actuating the steering actuator installation 70 as a function of a synchronization offset and of an offset correction variable, in particular in such a manner that a corrected wheel steering movement is effected in response to a steering input performed in the event of an existing synchronization offset in the error-free state of the feedback actuator installation 30, the corrected wheel steering movement leading to a reduction of the synchronization offset, in particular in such a manner that a synchronization offset is balanced when reaching a reference position of the steering input device 10, in particular when (re)attaining a straight-ahead position of the steering input device 10.

In order to avoid any confusion for a driver, in particular the sensation of a self-driving car, a wheel steering movement for reducing a synchronization offset in this steer-by-wire steering system 100 here can only be effected during or as a direct consequence of a steering input applied by a driver, and only in the same direction as the steering input, i.e. only in the identical direction.

Figure 2:
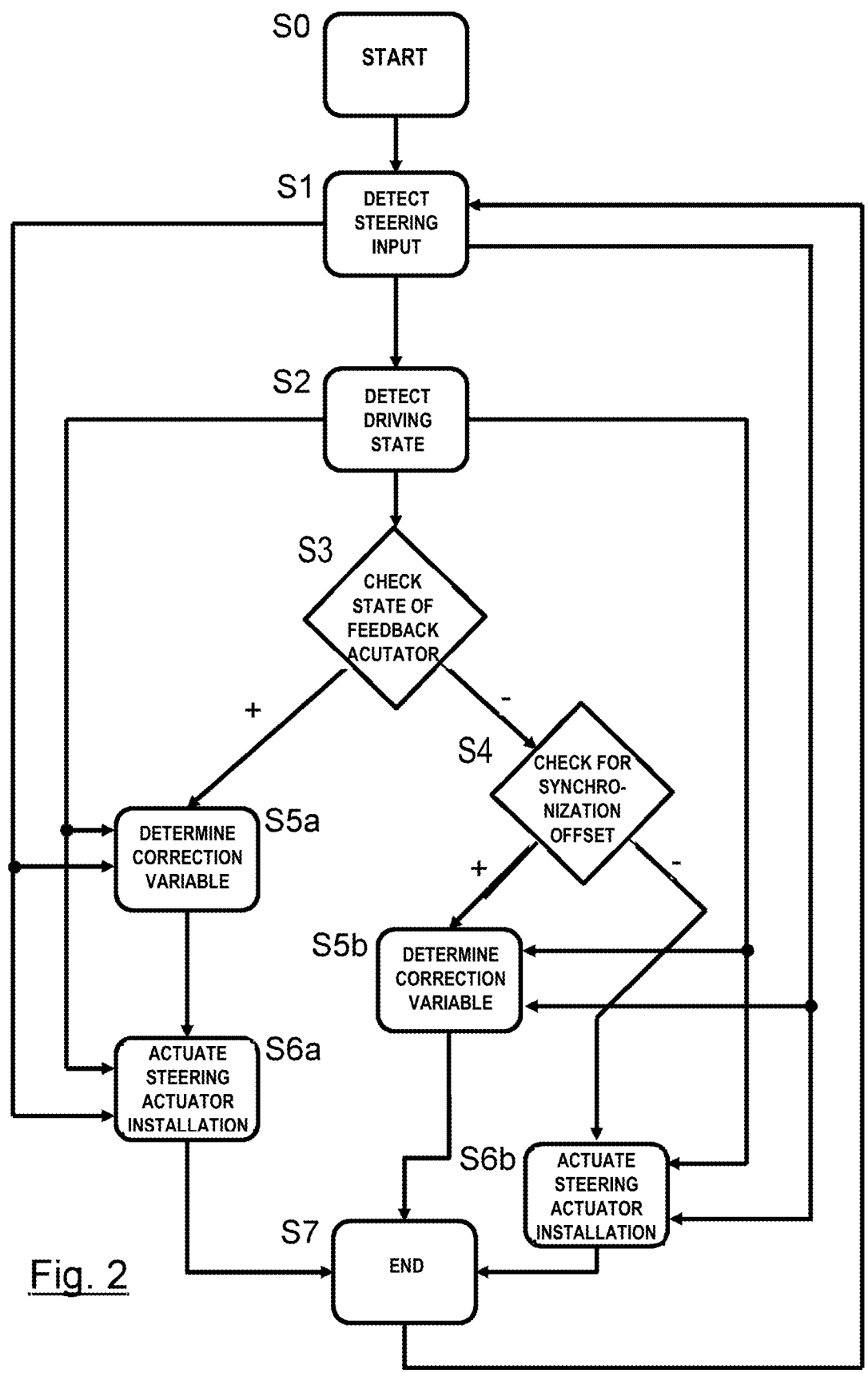
FIG. 2 is a flowchart with the individual steps of an exemplary embodiment for operating a steer-by-wire steering system according to the invention according to a method according to the invention.

FIG. 2 shows a flowchart with the individual steps S0, S1 and S2 of a first exemplary embodiment of a method according to the invention for operating a steer-by-wire steering system 100, wherein this exemplary embodiment of a method according to the invention after a start S0 comprises a first step S1 in which a steering input is detected, as well as a second step S2 in which a driving state is detected, wherein steps S1 and S2 can also be carried out simultaneously or in the reverse order and/or also after a next step S3 in which, according to the invention, a state of the feedback actuator installation 30 is checked, in particular as to whether an error state is present or absent.

If an error state is present ("+"), i.e. an error state of the feedback actuator installation 30, in particular a failure, is identified in step S3, at least one correction variable, in particular at least one steering input correction variable, is determined in a further step S5a, in particular as a function of a steering input travel, a steering input velocity and a steering input acceleration, i.e. in the present case in particular as a function of an applied steering angle δ, a steering angle velocity $\dot{δ}$ as well as a steering input acceleration $\ddot{δ}$, as well as at least one driving state correction variable, in particular as a function of a detected driving state variable, in the present case in particular as a function of a vehicle speed $v_x$, a longitudinal and/or transverse acceleration $a_x$ or $a_y$, respectively, a yaw rate ψ and/or a slip angle β, and in a further step S6a the steering actuator installation 70 is correspondingly actuated, in particular as a function of an applied steering input, a current driving state and the determined correction variables, before the method ends in step S7. The correction variable(s) here is/are determined in such a manner that the wheel steering movement effected leads to a vehicle reaction which is appropriate for the situation, in particular to a vehicle reaction which is as close as possible to the actual vehicle reaction desired by a driver.

In the absence of an error state ("−"), i.e. an error-free state of the feedback actuator installation 30 is identified in step S3, it is checked in a step S4 whether a synchronization offset is present. In the affirmative ("+"), at least one correction variable, in particular at least one offset correction variable, is determined in a next step S5b, and in a further step S6b the steering actuator installation 70 is correspondingly actuated, in particular as a function of an applied steering input, a current driving state and the determined correction variables, before the method ends in step S7.

The offset correction variable(s) here is/are determined in such a manner that a corrected wheel steering movement is effected as a response to a steering input performed in the event of an existing synchronization offset in the error-free state of the feedback actuator installation 30, the corrected wheel steering movement leading to a reduction of the synchronization offset, in particular in such a manner that a synchronization offset is balanced when reaching a reference position of the steering input device 10, in particular when (re)attaining a straight-ahead position of the steering input device 10.

In order to avoid any confusion for a driver, in particular the sensation of a self-driving car, a wheel steering movement for reducing a synchronization offset here is initiated only during or directly as a consequence of a steering input applied by a driver, and only in the same direction as the steering input, i.e. only in the identical direction.

If it is established in step S4 that no synchronization offset is present ("−"), no offset correction variable is determined and the steering actuator installation 70 is actuated in such a manner that the wheel steering movement to be actually implemented is effected. Alternatively, a neutral offset correction variable, i.e. an offset correction variable which leads neither to a reduction nor to an amplification of the wheel steering movement to be actually implemented, can also be determined, i.e. a correction factor of 1, for example.

Steps S1 to S7 here can be repeated at will.

Of course, a multiplicity of variants, in particular of variants in terms of construction, of the exemplary embodiment explained are possible without departing from the scope of the patent claims.

LIST OF REFERENCE SIGNS

100 Exemplary embodiment of a steer-by-wire steering system according to the invention
10 Steering input device, steering wheel
11 Steering wheel proximal steering shaft
30 Feedback actuator installation
40 Steering angle sensor
50 Control installation
51 Feedback actuator monitoring installation
52 Synchronization monitoring installation
60 Steering gear proximal steering shaft
70 Steering actuator installation
80 Steering gear
81 Tie rod
82 Steerable vehicle wheel
120 Steering assembly
$a_x$ Longitudinal acceleration
$a_y$ Transverse acceleration
α Wheel steering angle
β Slip angle
δ Steering angle at the steering input device
$\dot{δ}$ Steering angle velocity at the steering input device
$\ddot{δ}$ Steering angle acceleration at the steering input device
$\dot{ψ}$
P1 . . . P4 Signal path
s Rack position
S0 . . . S7 Method steps
$v_x$ Vehicle speed
y Steering actuator position
+ "yes"
− "no"

The invention claimed is:

1. A steer-by-wire steering system for steering at least one steerable vehicle wheel of a vehicle, comprising:
a steering input device for a steering input by a driver;
a feedback actuator installation for generating a steering input dependent and/or driving state dependent defined feedback steering torque at the steering input device;
a steering assembly connectable to the at least one steerable vehicle wheel and having a steering actuator installation;
a control installation;
a feedback actuator monitoring installation; and
a synchronization monitoring installation;
wherein the feedback actuator monitoring installation, in at least one operating state of the steer-by-wire steering system, is configured for identifying at least one state of the feedback actuator installation, in particular at least one error state;
wherein the control installation, in at least one operating state of the steer-by-wire steering system, is configured for actuating the steering actuator installation as a function of a steering input and as a function of a state of the feedback actuator installation;
wherein the synchronization monitoring installation, in at least one operating state of the steer-by-wire steering system, is configured for determining a synchronization offset between a current position of the steering input device and a current position of the steering assembly, the steering actuator installation and/or the at least one steerable vehicle wheel; and wherein the control installation, in at least one operating state of the steer-by-wire steering system, is further configured for actuating the steering actuator installation further as a function of the synchronization offset determined by the synchronization monitoring installation, such that a corrected wheel steering movement is effected when reaching a straight-ahead reference position of the steering input device, and a further steering input is performed by the driver.

2. The steer-by-wire steering system according to claim 1, wherein the control installation, in at least one operating state, is further configured for additionally actuating the steering actuator installation as a function of a driving state.

3. The steer-by-wire steering system according to claim 1, wherein the control installation, in at least one operating state of the steer-by-wire steering system, is configured for actuating the steering actuator installation as a function of an applied steering input and at least one determined correction variable comprising at least one of: a steering input correction variable, a driving state correction variable, or a synchronization offset correction variable, for correcting the defined wheel steering movement to be actually implemented.

4. The steer-by-wire steering system according to claim 3, wherein the control installation is configured for determining at least one steering input correction variable, at least partially as a function of a steering input travel, a steering input velocity and/or a steering input acceleration.

5. The steer-by-wire steering system according to claim 4, wherein the control installation is configured for determining at least one steering input correction variable at least partially as a function of a steering input performed and detected prior to an occurrence of an error state of the feedback actuator installation and/or at least partially as a function of a steering input performed and detected during an error state of the feedback actuator installation.

6. The steer-by-wire steering system according to claim 3, wherein the control installation is configured for determining at least one driving state correction variable at least partially as a function of at least one detected driving state variable comprising at least one of: a vehicle speed, a transverse acceleration, a longitudinal acceleration, a yaw rate or a slip angle.

7. The steer-by-wire steering system according to claim 6, wherein the control installation is configured for determining at least one driving state correction variable at least partially as a function of a driving state detected prior to the occurrence of an error state of the feedback actuator installation and/or at least partially as a function of a driving state detected during an error state of the feedback actuator installation.

8. The steer-by-wire steering system according to claim 3, wherein the control installation is configured for determining at least one offset correction variable at least partially as a function of a variable of the synchronization offset, an absolute position of the steering input device, and/or an absolute position of at least one of the steering assembly, the steering actuator installation or the at least one steerable vehicle wheel.

9. The steer-by-wire steering system according to claim 1, wherein the control installation, in at least one error state of the feedback actuator installation, is configured for actuating the steering actuator installation as a function of at least one steering input correction variable and/or at least one driving state correction variable, such that a corrected wheel steering movement is effected as a response to a steering input performed in the error state of the feedback actuator installation.

10. The steer-by-wire steering system according to claim 1, wherein the control installation, in an error-free state of the feedback actuator installation, is configured for actuating the steering actuator installation as a function of a steering input and as a function of a synchronization offset and/or an offset correction variable.

11. The steer-by-wire steering system according to claim 10, wherein the control installation is configured for actuating the steering actuator installation as a function of a synchronization offset and/or an offset correction variable such that, as a response to a steering input performed in an event of an existing synchronization offset in the error-free state of the feedback actuator installation, a wheel steering movement, which is corrected in comparison to a defined wheel steering movement which in an error-free state of the feedback actuator installation without a synchronization offset is to be actually implemented as a response to the performed steering input, is effected.

12. The steer-by-wire steering system according to claim 11, wherein the control installation is configured for actuating the steering actuator installation as a function of the synchronization offset and/or an offset correction variable such that the corrected wheel steering movement is effected when reaching the straight-ahead reference position of the steering input device, and the further steering input is performed by the driver.

13. The steer-by-wire steering system according to claim 1, wherein the steer-by-wire steering system is configured such that a wheel steering movement for reducing the synchronization offset is able to be effected only during or as a direct consequence of the steering input applied by a driver.

14. The steer-by-wire steering system according to claim 1, wherein the steer-by-wire steering system is configured such that a wheel steering movement for reducing the synchronization offset is able to be effected only in the same direction as the steering input applied by the driver.

15. A vehicle comprising a steer-by-wire steering system according to claim 1.

16. A method for operating a steer-by-wire steering system functionally installed in a vehicle and comprising:
  a steering input device for a steering input by a driver;
  a feedback actuator installation for generating a steering input dependent and/or driving state dependent defined feedback steering torque at the steering input device;
  a steering assembly which is connectable to the at least one steerable vehicle wheel and has a steering actuator installation;
  a control installation;
  a feedback actuator monitoring installation; and
  a synchronization monitoring installation;
  wherein the synchronization monitoring installation, in at least one operating state of the steer-by-wire steering system, is configured for determining a synchronization offset between a current position of the steering input device and a current position of the steering assembly, the steering actuator installation and/or the at least one steerable vehicle wheel; and
  wherein the control installation, in at least one operating state of the steer-by-wire steering system, is further configured for actuating the steering actuator installation further as a function of the synchronization offset determined by the synchronization monitoring installation, such that a corrected wheel steering movement is effected when reaching a straight-ahead reference position of the steering input device, and a further steering input is performed by the driver;

wherein the method comprises:

checking a state of the feedback actuator installation, by way of the feedback actuator monitoring installation; and actuating the steering actuator installation, by way of the control installation, as a function of a steering input and as a function of the state of the feedback actuator installation.

17. The method according to claim 16, further comprising:

actuating the steering actuator installation, when an error state of the feedback actuator installation has been identified by way of the control installation, such that a reduced wheel steering movement or no wheel steering movement is effected, wherein the steering actuator installation is actuated as a function of at least one steering input correction variable and/or a driving state correction variable.

18. The method according to claim 16, further comprising:

determining, when an error-free state of the feedback actuator installation has been detected, a synchronization offset between a current position of the steering input device and a current position of the steering actuator installation and/or the at least one steerable vehicle wheel by way of the synchronization monitoring installation; and should a synchronization offset be present, the steering actuator installation is further actuated as a function of a synchronization offset and an offset correction variable.

* * * * *